(12) United States Patent
Dequarti et al.

(10) Patent No.: US 9,518,666 B2
(45) Date of Patent: Dec. 13, 2016

(54) BIDIRECTIONAL TRAVEL STOP ASSEMBLY FOR COMPACT ACTUATOR

(71) Applicant: Cameron International Corporation, Houston, TX (US)

(72) Inventors: Alberto Dequarti, Mede (IT); Davide Navone, Sannazzaro de' Burgondi (IT)

(73) Assignee: Cameron International Corporation, Houston, TX (US)

( * ) Notice: Subject to any disclaimer, the term of this patent is extended or adjusted under 35 U.S.C. 154(b) by 113 days.

(21) Appl. No.: 14/471,985

(22) Filed: Aug. 28, 2014

(65) Prior Publication Data
US 2015/0060714 A1 Mar. 5, 2015

(30) Foreign Application Priority Data
Aug. 29, 2013 (IT) .................................. EP13182290

(51) Int. Cl.
| | |
|---|---|
| *F16K 1/52* | (2006.01) |
| *F16K 5/10* | (2006.01) |
| *F15B 15/24* | (2006.01) |
| *F16K 31/163* | (2006.01) |
| *F16K 31/122* | (2006.01) |

(52) U.S. Cl.
CPC .................. *F16K 5/10* (2013.01); *F15B 15/24* (2013.01); *F16K 1/523* (2013.01); *F16K 31/122* (2013.01); *F16K 31/163* (2013.01)

(58) Field of Classification Search
CPC ........ F16K 1/523; F16K 31/122; F16K 31/16; F16K 31/163; F16K 31/1635; F15B 15/24; F15B 15/068; F16H 25/2025; F16D 2125/06
USPC .... 251/60, 62, 285, 288; 92/13.6; 74/424.78
See application file for complete search history.

(56) References Cited

U.S. PATENT DOCUMENTS

| | | | |
|---|---|---|---|
| 4,545,289 A | 10/1985 | Weyer | |
| 4,744,386 A * | 5/1988 | Frazer | F16K 31/1221 137/315.29 |
| 5,170,693 A * | 12/1992 | Stary | F16K 31/1635 251/63.4 |

(Continued)

FOREIGN PATENT DOCUMENTS

| | | |
|---|---|---|
| EP | 1566552 A1 | 8/2005 |
| FR | 2201409 A1 | 4/1974 |

(Continued)

OTHER PUBLICATIONS

Extended European Search Report for EP Application No. 13182290.0 dated Jan. 28, 2014, 7 pages.

*Primary Examiner* — Matthew W Jellett
(74) *Attorney, Agent, or Firm* — Fletcher Yoder, P.C.

(57) ABSTRACT

Embodiments of the present disclosure are directed toward a bidirectional travel stop assembly including a first travel stop configured to block a first axial movement of an actuation element of a valve actuator, a second travel stop configured to block a second axial movement of the actuation element, and a travel stop bushing configured to block adjustment of the second travel stop and allow adjustment of the first travel stop when the travel stop bushing is disposed within the valve actuator in a first axial orientation, wherein the travel stop bushing is configured to enable adjustment of the second travel stop when the travel stop bushing is disposed within the valve actuator in a second axial orientation.

17 Claims, 8 Drawing Sheets

(56) References Cited

U.S. PATENT DOCUMENTS

| | | | |
|---|---|---|---|
| 6,994,312 B2 * | 2/2006 | Pauer | F02M 63/0015 251/129.18 |
| 7,487,708 B2 * | 2/2009 | Harashima | F15B 15/24 92/13.6 |

FOREIGN PATENT DOCUMENTS

| | | | |
|---|---|---|---|
| FR | 2213225 A1 | 8/1974 | |
| FR | 2231873 A1 | 12/1974 | |

* cited by examiner

FIG. 11

BIDIRECTIONAL TRAVEL STOP ASSEMBLY FOR COMPACT ACTUATOR

CROSS REFERENCE TO RELATED APPLICATION

This application claims priority from and the benefit of European Patent Application Serial No. EP13182290.0, entitled "BIDIRECTIONAL TRAVEL STOP ASSEMBLY FOR COMPACT ACTUATOR", filed Aug. 29, 2013, which is hereby incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As will be appreciated, oil and natural gas are fluids that have a profound effect on modern economies and societies. Indeed, devices and systems that depend on oil and natural gas are ubiquitous. For instance, oil and natural gas are used for fuel in a wide variety of vehicles, such as cars, airplanes, boats, and the like. Further, oil and natural gas are frequently used to heat homes during winter, to generate electricity, and to manufacture an astonishing array of everyday products.

The flow of fluid, whether petroleum-based or otherwise, can be controlled with valves. Fluid flows through a valve in an open configuration, but that flow can be interrupted by transitioning the valve to a closed configuration. While many valves are manually actuated between the open and closed configurations, more-robust valves found in industrial settings are typically actuated mechanically by a hydraulic, electric, or pneumatic actuator, for example.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are directed towards an integrated bidirectional travel stop assembly for an actuator (e.g., a compact actuator). More specifically, the integrated bidirectional travel stop assembly may be configured to enable independent setting and adjustment of the open and closed positions of a valve actuated by the actuator. For example, as discussed in detail below, the integrated bidirectional travel stop assembly may include an upper travel stop that may be independently adjusted to increase and/or decrease the stroke (e.g., range of movement) of the actuator. As such, through adjustment of the upper travel stop, the opened or closed position of a valve may be adjusted. Similarly, the integrated bidirectional travel stop assembly may include a lower travel stop that may be independently adjusted to increase and/or decrease the stroke of the actuator. As such, through adjustment of the lower travel stop, the opened or closed position of a valve may be adjusted. Furthermore, as discussed in detail below, the integrated bidirectional travel stop assembly may include a travel stop bushing configured to enable adjustment of the lower travel stop when the travel stop bushing is in a first axial orientation within the actuator. Additionally, while the upper travel stop is adjusted, the travel stop bushing may be positioned in a second axial orientation within the actuator to block adjustment of the lower travel stop.

Figure 1:
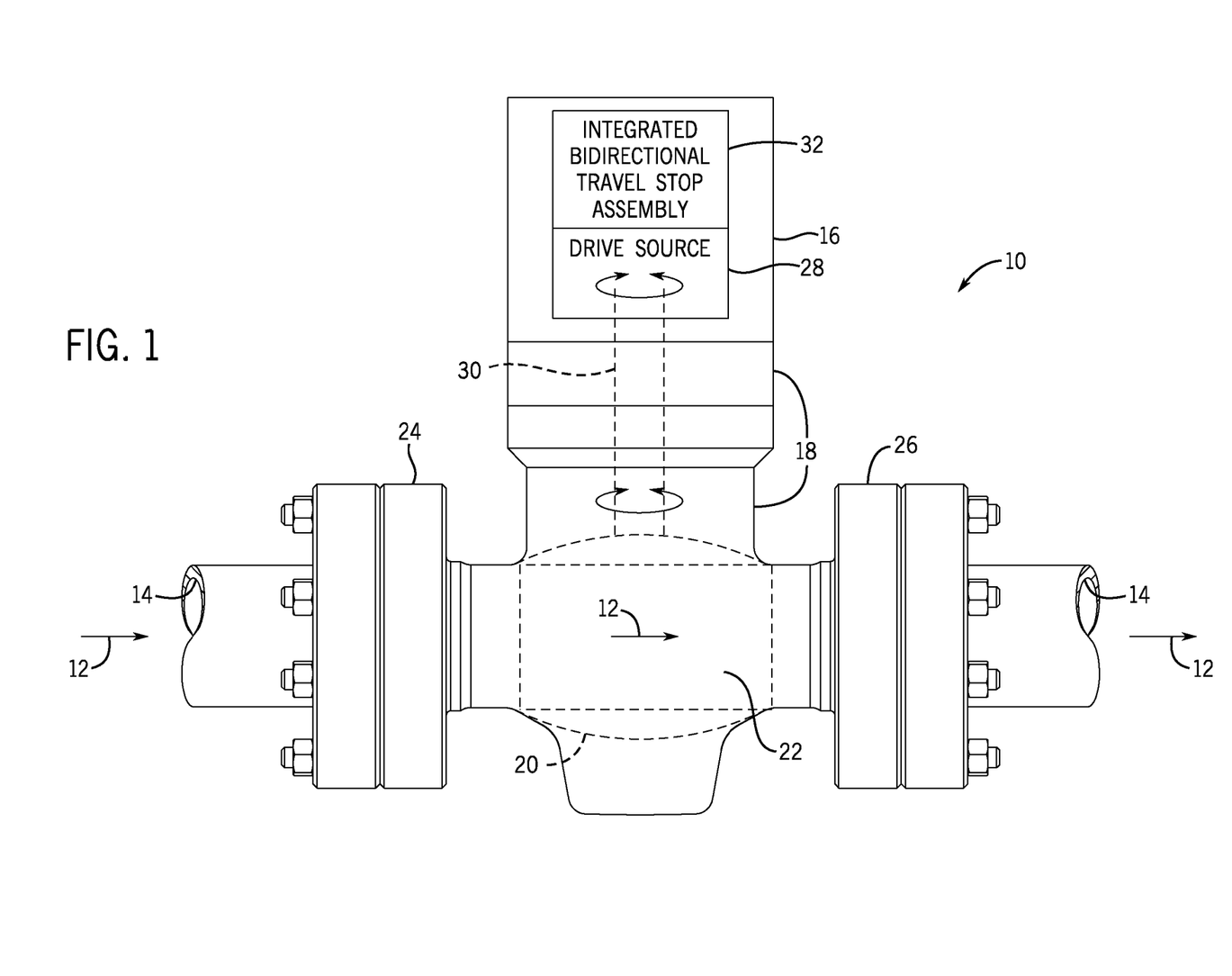
FIG. 1 is a diagrammatic illustration of a valve assembly having an actuator, in accordance with an embodiment of the present disclosure.

FIG. 1 is a diagrammatic illustration of a valve assembly 10 for controlling a flow 12 of a fluid through a flow path 14.

The valve assembly 10 includes an actuator 16 (e.g., a compact actuator) that is coupled to a valve body 18. The valve body may support any number of valve types, examples of which are butterfly valves, ball valves, quarter-turn valves, gate valves, to name but a few. As illustrated, the valve body 18 carries a ball valve 20. In the open configuration, a through bore 22 of the ball valve 20 is aligned with an inlet 24 and an outlet 26 of the valve assembly 10. This allows the flow 12 to pass through the valve. The flow 12 can be interrupted by turning the ball valve 20 to place the through bore 22 perpendicular to the inlet 24 and outlet 26. In other words, a quarter-turn of the ball valve 20 transitions the valve assembly 10 between open and closed configurations. The valve assembly 10 is generally configured to control a flow of fluid through the valve assembly 10 in various applications. For example, the valve assembly 10 may be employed in applications relating to oil and gas industries (e.g., subsea and/or surface applications), power generation industries, petrochemical industries, and the like. In certain embodiments, the valve assembly 10 may be coupled to a Christmas tree for petroleum and natural gas extraction.

To effectuate this quarter-turn, the actuator 16 provides a motive force through a drive source 28. The drive source 28 may be one of any number of suitable devices, such as an hydraulic actuator, an electric and linear motor, a pneumatic device, a spring return actuator, or a manual wheel, to name a few. In the illustrated embodiment, the drive source 28 is coupled to a valve stem 30 attached to the ball valve 20. In operation, the drive source 28 may apply a torque to the valve stem 30. As the stem 30 is fixed to the ball valve 20, the torque on the stem 38 is transferred to the ball valve 20, and rotation of the stem 30 causes rotation of the ball valve 20. Accordingly, the drive source 28 can be used to rotate the ball valve 20 and transition the valve assembly 10 between the open and closed configurations to control the flow 12 through the flow path 14. The valve assembly 10 may be used in an on/off manner to allow or restrict flow from upstream components to downstream components along the flow path 14.

As described in detail below, the actuator 16 may include an integrated bidirectional travel stop assembly 32, which provides two separate adjustments rather than a single adjustment. More specifically, the integrated bidirectional travel stop assembly 32 may be configured to enable independent setting and adjustment of the open and closed positions of the ball valve 20, thereby providing more adjustability and fine tuning in both directions. For example, as discussed in detail below, the integrated bidirectional travel stop assembly 32 may include an upper travel stop that may be independently adjusted to increase and/or decrease the stroke (e.g., range of movement) of the actuator 16. Additionally, through adjustment of the upper travel stop, the fully opened or fully closed position of the ball valve 20 may be adjusted. Similarly, the integrated bidirectional travel stop assembly 32 may include a lower travel stop that may be independently adjusted to increase and/or decrease the stroke of the actuator 16. Additionally, through adjustment of the lower travel stop, the fully opened or fully closed position of the ball valve 20 may be adjusted. Furthermore, as discussed in detail below, the integrated bidirectional travel stop assembly 32 may include a travel stop bushing configured to enable adjustment of the lower travel stop when the travel stop bushing is in a first axial orientation. Additionally, while the upper travel stop is adjusted, the travel stop bushing may be positioned in a second axial orientation to block adjustment of the lower travel stop.

The discussion below describes the integrated bidirectional travel stop assembly 32 in an embodiment where the actuator 16 is a hydraulic actuator. However, in other embodiments, the integrated bidirectional travel stop assembly 32 may be incorporated with other actuators 16, such as spring return actuator, a pneumatic actuator, an electric actuator, or other type of actuator. Furthermore, it should be appreciated that the valve assembly 10 may be bi-directional, and the terms "inlet", "outlet," "upstream," and "downstream" are used for ease of reference and do not describe any specific directional limitation of the valve assembly 10. Moreover, the use of the adjectival or adverbial modifiers "horizontal" and "vertical," "upwardly" and "downwardly," or "clockwise" and "counter-clockwise" are also only used for ease of relative reference between the sets of terms and do not describe any specific directional limitation on the modified term.

Figure 2:
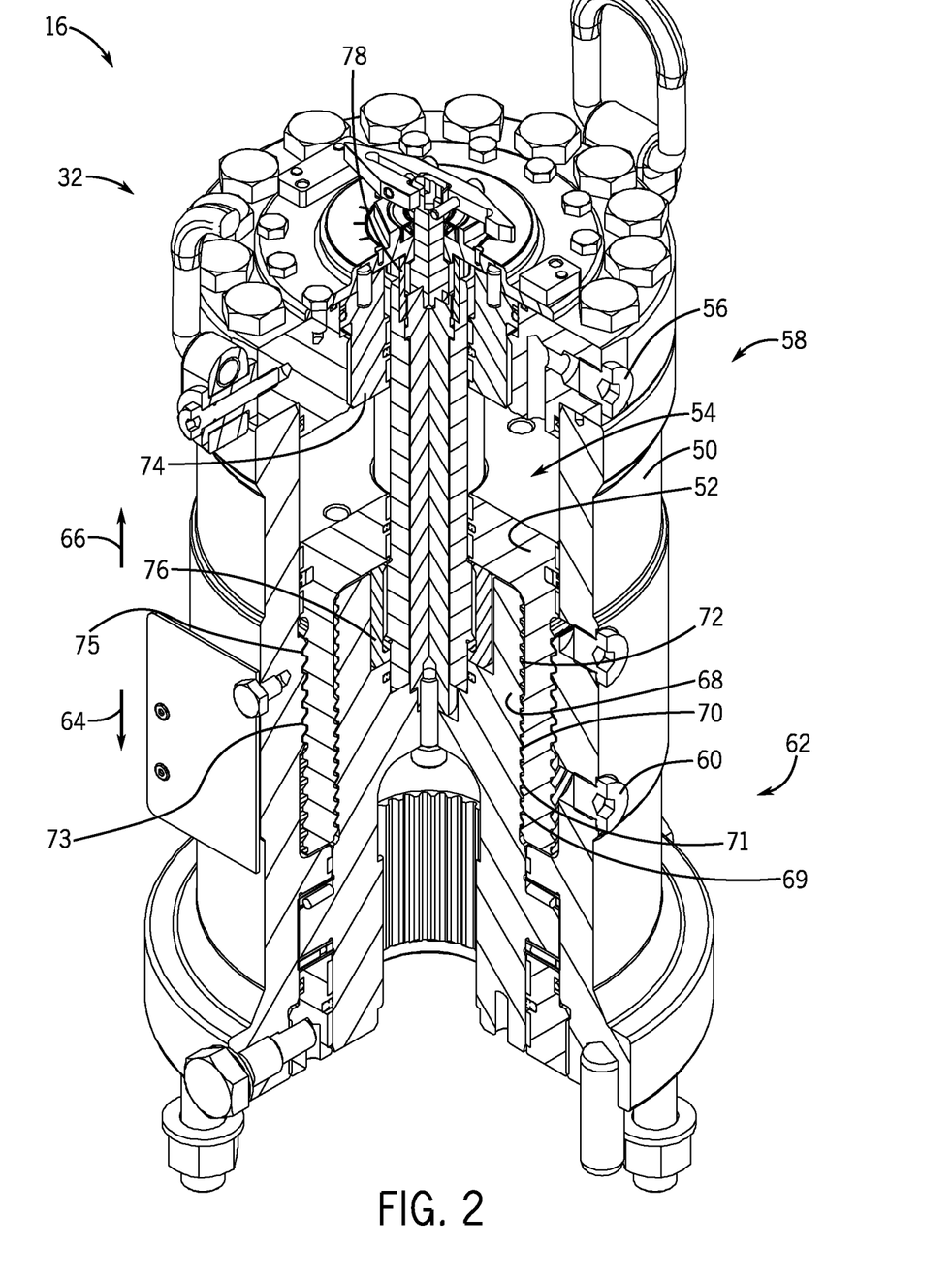
FIG. 2 is a partial cut-away view of an actuator having an integrated bidirectional adjustable travel stop assembly, in accordance with an embodiment of the present disclosure.

FIG. 2 is a cross-sectional view of an embodiment of the actuator 16 having the integrated bidirectional travel stop assembly 32. As discussed above, the actuator 16 is configured to actuate movement of the ball valve 20. For example, the actuator 16 may provide a rotational force or torque to the valve stem 30 of the valve assembly 10 to rotate the ball valve 20 between open and closed positions. In the illustrated embodiment, the actuator 16 (e.g., the drive source 28) is hydraulic. Specifically, the actuator 16 includes a frame 50 that houses a piston 52. As will be appreciated, the piston 52 may be moved (e.g., roto-translated and/or linearly translated) or actuated by pumping a hydraulic fluid into a piston chamber 54 of the frame 50. For example, the actuator 16 includes a first port 56 disposed on a first axial side 58 of the piston 52 and a second port 60 disposed on a second axial side 62 of the piston 52. As will be appreciated, to actuate (e.g., roto-translated and/or linearly translate) the piston 52 in a downward direction 64, a hydraulic fluid may be pumped into the first port 56. Similarly, to actuate (e.g., roto-translated and/or linearly translate) the piston 52 in an upward direction 66, a hydraulic fluid may be pumped into the second port 60.

As mentioned above, the actuator 16 is configured to apply a rotational force to the valve stem 30 of the valve assembly 10. To this end, the piston 52 is configured to engage with a torque tube 68 of the actuator 16, which is further coupled to the valve stem 30. More specifically, an inner diameter 70 of the piston 52 includes a helical or spiraling spline 69 (or other worm gear, spiral gear, or spiral threads) that engages with a mating helical or spiraling spline 71 (or other worm gear, spiral gear, or spiral threads) of an outer diameter 72 of the torque tube 68. Additionally, an outside diameter 73 of the piston 52 includes a helical or straight spline that engages with a mating helical or straight spline of an inner diameter 75 of the frame 50. As a result, when a hydraulic fluid is pumped into the piston chamber 54 of the actuator 16 through the first port 56 to actuate the piston 52 in the downward direction 64, the helical or spiraling splines 69 of the piston 52 and the helical or spiraling splines 71 of the torque tube 68 engage, thereby transferring the linear and/or roto-translation movement of the piston 52 into rotational movement of the torque tube 68 (e.g., in a clockwise or counter clockwise direction). Similarly, when a hydraulic fluid is pumped into the piston chamber 54 of the actuator 16 through the second port 60 to actuate the piston 52 in the upward direction 66, the helical splines 69, 71 of the piston 52 and the torque tube 68 engage, thereby transferring the linear and/or roto-translation movement of the piston 52 into rotational movement of the torque tube 68 (e.g., in a clockwise or counter clockwise direction).

In this manner, the valve stem 30 may be rotated by the actuator 16, thereby actuating the ball valve 20 between open and closed positions.

As mentioned above, the actuator 16 also includes the integrated bidirectional travel stop assembly 32. Specifically, the integrated bidirectional travel stop assembly 32 includes two travel stops configured to define or limit the travel distance of the piston 52 when the piston 52 is actuated by the hydraulic fluid. More specifically, the integrated bidirectional travel stop assembly 32 includes an upper or first travel stop 74 configured to stop movement (e.g., upward or first axial movement) of the piston 52 in the upward or first direction 66 and a lower or second travel stop 76 configured to stop movement (e.g., downward or second axial movement) of the piston 52 in the downward or second direction 64. As a result, the upper travel stop 74 and the lower travel stop 76 cooperatively define the range of axial movement (e.g., stroke) of the piston 52. As discussed in detail below, the upper travel stop 74 and the lower travel stop 76 are both independently adjustable. As a result, the upper and lower travel stops 74 and 76 may be independently set and adjusted to adjust the open and closed positions of the ball valve 20. For example, the upper travel stop 74 may be adjusted to set a maximum upward axial position of the piston 52 within the piston chamber 54, thereby setting the position of the ball valve 20 in the fully opened position. Similarly, the lower travel stop 76 may be adjusted to set a maximum downward axial position of the piston 52 within the piston chamber 54, thereby setting the position of the ball valve 20 in the fully closed position.

Furthermore, as discussed in detail below, the integrated bidirectional travel stop assembly 32 may include a travel stop bushing 78 (e.g., annular travel stop bushing) positioned within the actuator 16. Specifically, when the travel stop bushing 78 is disposed in a first axial orientation within the actuator 16, the travel stop bushing 78 may be configured to block adjustment of the lower travel stop 76, while allowing adjustment of the upper travel stop 74. Additionally, when the travel stop bushing 78 is disposed in a second axial orientation within the actuator 16, the travel stop bushing 78 may be configured to enable adjustment of the lower travel stop 76.

Figure 3:
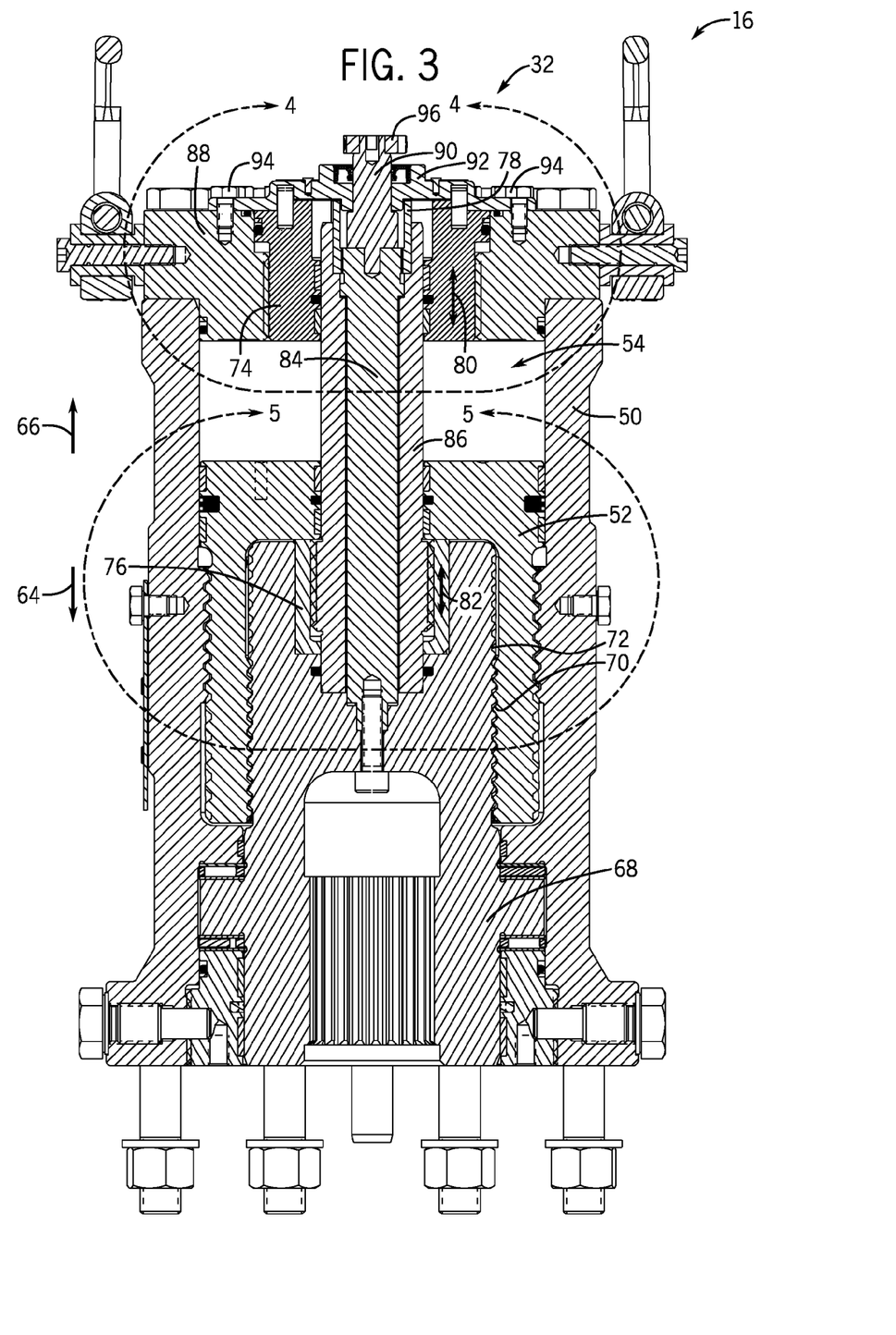
FIG. 3 is a cross-sectional view of an actuator having an integrated bidirectional adjustable travel stop assembly, in accordance with an embodiment of the present disclosure.

FIG. 3 is a cross-sectional view of the actuator 16, illustrating the integrated bidirectional travel stop assembly 32. As discussed above, the integrated bidirectional travel stop assembly 32 includes the upper and lower travel stops 74 and 76, which cooperatively defined the range of movement (e.g., stroke) of the piston 52 within the piston chamber 54 of the actuator 16. As a result, the upper and lower travel stops 74 and 76 set upper and lower limits, respectively, of the axial position of the piston 52. In other words, the upper and lower travel stops 74 and 76 define the fully opened and fully closed positions of the ball valve 20. Additionally, as mentioned above, the upper and lower travel stops 74 and 76 are each independently adjustable (e.g., axially adjustable). As such, the upward axial position limit of the piston 52 (e.g., set by the position of the upper travel stop 74) may be adjusted separately and independently from the lower travel stop 76, as indicated by bidirectional arrow 80. Similarly, the downward axial position limit of the piston 52 (e.g., set by the position of the lower travel stop 76) may be adjusted separately and independently from the upper travel stop 74, as indicated by bidirectional arrow 82.

The actuator 16 includes several additional components that will be referred to in the following discussion. For example, the actuator 16 includes a central shaft 84 disposed in a radial center of the actuator 16. In the illustrated embodiment, the central shaft 84 may be engaged with the torque tube 68. As a result, the rotation between the torque tube 68 and the central shaft 84 may be common and may be transmitted by the central shaft 84 to the microswitch adapter 90 and the position indicator 96. As shown, several components are disposed about the central shaft 84 in a substantially concentric arrangement, such as a travel stop tube 86 (e.g., annular travel stop tube), the upper travel stop 74, the lower travel stop 76, the piston 52, the torque tube 68, the travel stop bushing 78, and an upper flange 88 (e.g., annular flange) of the actuator 16. The actuator 16 also includes a microswitch adapter 90 extending axially from the central shaft 84 in the upward direction 66 and a top cover 92 disposed about the microswitch adapter 90. The top cover 92 covers the internal components of the actuator 16 (e.g., central shaft 84, travel stop tube 86, upper travel stop 74, lower travel stop 76, piston 52, torque tube 68, travel stop bushing 78, upper flange 88, etc.) and is fastened to the upper flange 88 by bolts 94. In certain embodiments, a position indicator 96 may be coupled to the microswitch adapter 90, and the position indicator 96 may be adjusted to indicate the position of the ball valve 20.

Figure 4:
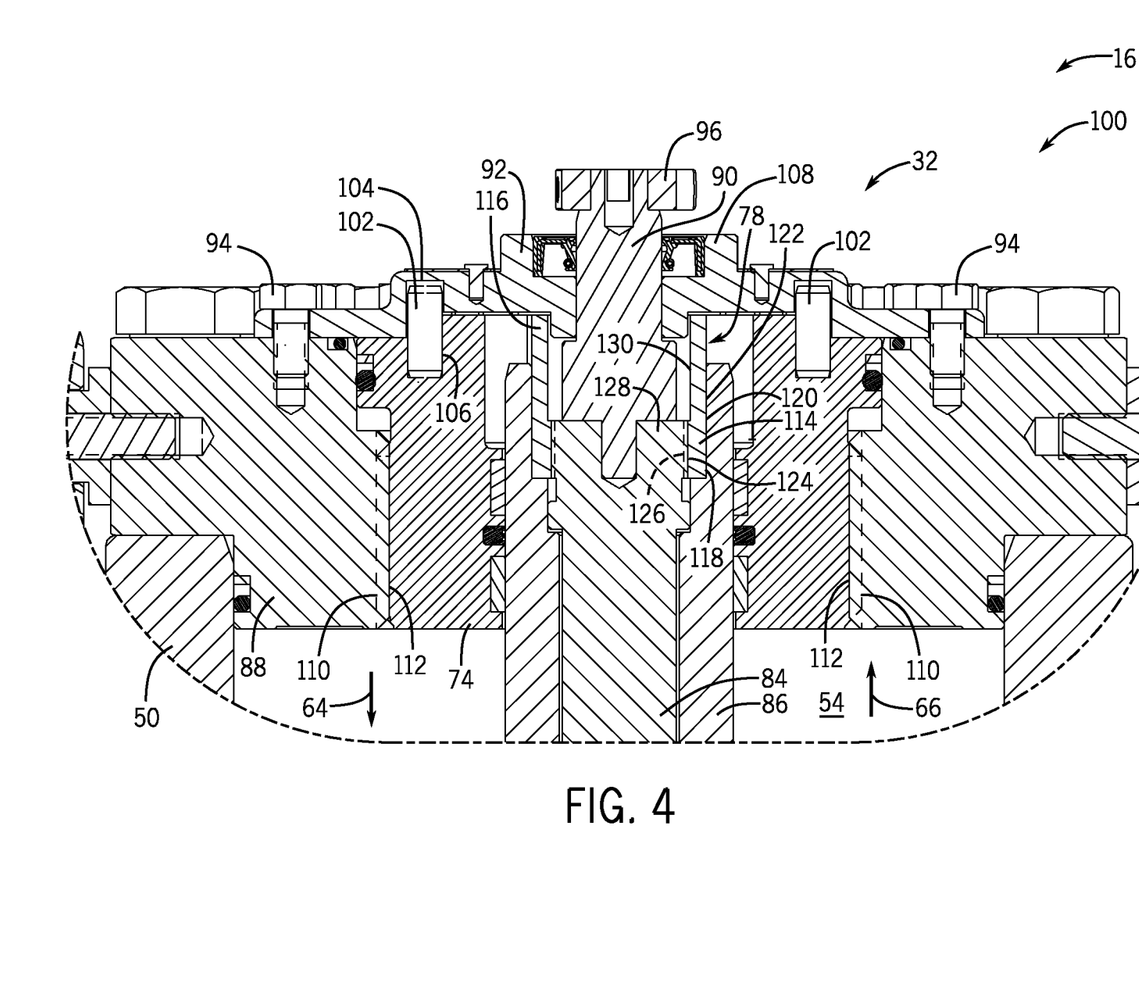
FIG. 4 is a partial cross-sectional view of an actuator having an integrated bidirectional adjustable travel stop assembly, in accordance with an embodiment of the present disclosure.

FIG. 4 is a partial cross-sectional view of the actuator 16, taken within line 4-4 of FIG. 3, illustrating an upper portion 100 of the actuator 16 and the integrated bidirectional travel stop assembly 32. As mentioned above, the upper travel stop 74 may be adjusted separately and independently from the lower travel stop 76. Additionally, in the illustrated embodiment, the travel stop bushing 78 is disposed within the actuator 16 in a first axial orientation. In the manner described below, when the travel stop bushing 78 is in the first axial orientation, the travel stop bushing 78 may block adjustment of the lower travel stop 76, while allowing adjustment of the upper travel stop 74. As a result, unintentional or undesired adjustment of the lower travel stop 76 can be reduced.

As mentioned above, the actuator 16 has a top cover 92 (e.g., axial end cover) that is secured to the upper flange 88 by threaded fasteners, e.g., bolts 94. Additionally, the actuator 16 includes pins 102 engaged with and extending between the top cover 92 and the upper flange 88. That is, each pin 102 extends into a respective recess 104 of the top cover 92 and a respective recess 106 of the upper flange 88. To adjust the upper travel stop 74, the bolts 94 may be removed from the top cover 92, as discussed below. Additionally, the position indicator 96 may be removed.

After the bolts 94 and the position indicator 96 are removed, adjustment of the upper travel stop 74 is effectuated by rotating the top cover 92 (e.g., rotating the top cover 92 about the microswitch adapter 90). Specifically, the top cover 92 includes an axial protrusion or extrusion 108, which may have a hexagonal outer diameter (e.g., perimeter). As such, a wrench or other tool may be used to enable rotation of the top cover 92. However, in other embodiments, the extrusion 108 may have other configurations or shapes to enable rotation of the top cover 92. As the top cover 92 is rotated, the pins 102 transfer rotational movement of the top cover 92 to the upper travel stop 74, thereby causing the upper travel stop 74 to rotate about the travel stop tube 86. Furthermore, as shown, an outer diameter 110 (e.g., outer threads) of the upper travel stop 74 is threadably engaged with an inner diameter 112 (e.g., inner threads) of the upper flange 88. In other words, the outer diameter 110 of the upper travel stop 74 is threaded, and the inner diameter 112 of the upper flange 88 is threaded. Accordingly, when the upper travel stop 74 is driven into rotation, the threads of the outer diameter 110 of the upper travel stop 74 and the threads of the inner diameter 112 of the upper flange 88 engage with one another and enable axial movement of the upper travel stop 74. For example, clockwise rotation of the top cover 92, and thus clockwise rotation of the upper travel stop 74, may cause axial movement of the upper travel stop 74 in the downward direction 64. However, in other embodiments, clockwise rotation of the top cover 92, and thus clockwise rotation of the upper travel stop 74, may cause axial movement of the upper travel stop 74 in the upward direction 66. Similarly, counter clockwise rotation of the top cover 92, and thus counter clockwise rotation of the upper travel stop 74, may cause axial movement of the upper travel stop 74 in the upward direction 66. However, in other embodiments, counter clockwise rotation of the top cover 92, and thus counter clockwise rotation of the upper travel stop 74, may cause axial movement of the upper travel stop 74 in the downward direction 64. In this manner, the position of the upper travel stop 74 may be adjusted, thereby adjusting the range of movement (e.g., stroke or axial distance) of the piston 52. That is, the upper most and/or lowermost positions of the piston 52 may be adjusted.

As mentioned above, in the illustrated embodiment, the travel stop bushing 78 is disposed within the actuator 16 in a first axial orientation. More specifically, a first axial end 114 of the travel stop bushing 78 is disposed axially downward within the actuator 16, and a second axial end 116 of the travel stop bushing 78 is disposed axially upward within the actuator 16. Furthermore, as shown, the travel stop bushing 78 is disposed within a recess 118 of the travel stop tube 86 and about the central shaft 84. As discussed in detail below, an outer diameter 120 of the travel stop bushing 78 and an inner diameter 122 of the recess 118 of the travel stop tube 86 may have similar shapes or configurations. For example, the outer diameter 120 (e.g., perimeter) of the travel stop bushing 78 and the inner diameter 122 (e.g., perimeter) of the recess 118 of the travel stop tube 86 may both have a hexagonal shape. As a result, rotational movement of the travel stop bushing 78 (e.g., imparted by a wrench or other tool) may be transferred to the travel stop tube 86.

Moreover, an inner diameter 124 of the first axial end 114 of the travel stop bushing 78 has a splined configuration (e.g., axially splined). Additionally, an outer diameter 126 of an axial end 128 of the central shaft 84 also has a splined configuration. As such, when the first axial end 114 of the travel stop bushing 78 is disposed in the first axial orientation shown in FIG. 4, the splines (e.g., axial splines) of the inner diameter 124 of the first axial end 114 of the travel stop bushing 78 and the splines (e.g., axial splines) of the outer diameter 126 of the axial end 128 of the central shaft 84 engage with one another, thereby blocking rotation of the travel stop bushing 78.

To allow adjustment of the lower travel stop 76, the travel stop bushing 78 may be placed within the actuator 16 in a second axial orientation. Specifically, the top cover 92 may be removed from the actuator 16, and the travel stop bushing 78 may be removed, axially rotated 180 degrees (e.g., axially reversed), and positioned back in the actuator 16 with the second axial end 116 of the travel stop bushing 78 is disposed axially downward within the actuator 16 and the first axial end 114 is disposed axially upward within the actuator 16. As shown, an inner diameter 130 of the second axial end 116 of the travel stop bushing 78 may not have a splined configuration. Rather, the inner diameter 130 may be a cylindrical, curved, and/or smooth surface. Accordingly, when the second axial end 116 of the travel stop bushing 78 is disposed axially downward within the actuator 16 and the first axial end 114 is disposed axially upward within the actuator 16 (i.e., in the second axial orientation), the splines of the outer diameter 126 of the axial end 128 of the central shaft 84 may not engage with the travel stop bushing 78. As a result, rotation of the travel stop bushing 78 (e.g., imparted by a wrench or other tool) may not be blocked and may be transferred to the travel stop tube 86. In the manner described below, rotation of the travel stop bushing 78, and thus rotation of the travel stop tube 86, enables adjustment of the lower travel stop 76.

Figure 5:
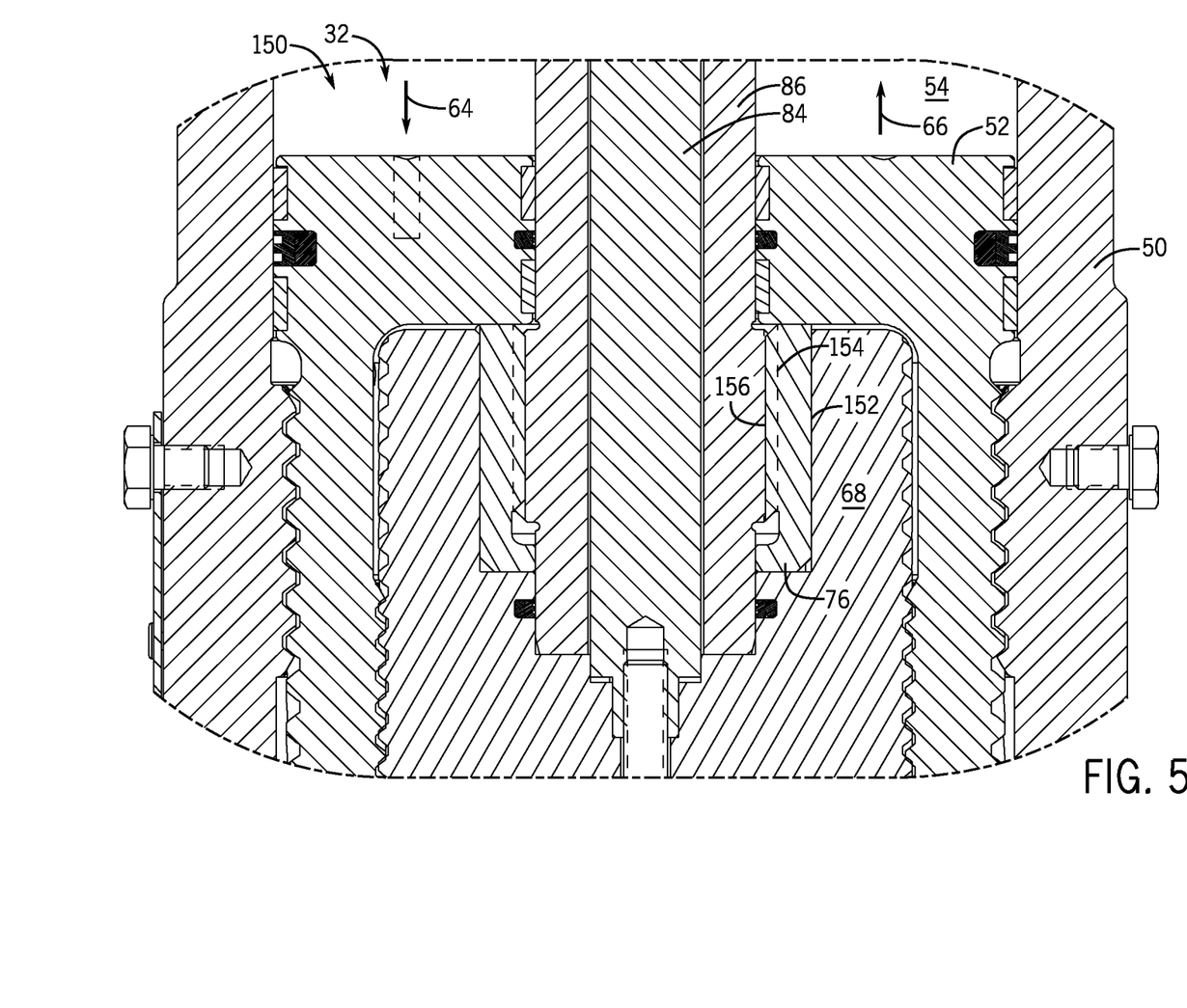
FIG. 5 is a partial cross-sectional view of an actuator having an integrated bidirectional adjustable travel stop assembly, in accordance with an embodiment of the present disclosure.

FIG. 5 is a partial cross-sectional view of the actuator 16, illustrating a lower portion 150 of the actuator 16 and the integrated bidirectional travel stop assembly 32. Specifically, the illustrated embodiment shows the lower travel stop bushing 76, which is disposed within a recess 152 of the torque tube 68 and disposed about the travel stop tube 86. As mentioned above, rotation of the travel stop bushing 78, and thus rotation of the travel stop tube 86, enables adjustment of the lower travel stop 76. More specifically, when the travel stop bushing 78 is disposed in the second axial orientation (i.e., with the second axial end 116 of the travel stop bushing 78 disposed axially downward within the actuator 16 and the first axial end 114 disposed axially upward within the actuator 16), the travel stop bushing 78 may be rotated (e.g., via a wrench or other tool), thereby transferring rotational movement to the travel stop tube 86.

As shown, an outer diameter 154 (e.g., outer threads) of the travel stop tube 86 is threadably engaged with an inner diameter 156 (e.g., inner threads) of the lower travel stop 76. In other words, the outer diameter 154 of the travel stop tube 86 is threaded, and the inner diameter 156 of the lower travel stop 76 is threaded. Accordingly, when the travel stop tube 86 is driven into rotation, the threads of the outer diameter 154 of the travel stop tube 86 and the threads of the inner diameter 156 of the lower travel stop 76 engage with one another and enable axial movement of the lower travel stop 76. For example, clockwise rotation of the travel stop bushing 78 and the travel stop tube 86 may cause axial movement of the lower travel stop 76 in the downward direction 64. Similarly, counter clockwise rotation of the travel stop bushing 78 and the travel stop tube 86 may cause axial movement of the lower travel stop 76 in the upward direction 66. In this manner, the position of the lower travel stop 76 may be adjusted, thereby adjusting the range of movement (e.g., stroke or axial distance) of the piston 52. That is, the upper most and/or lowermost positions of the piston 52 may be adjusted.

Figure 6:
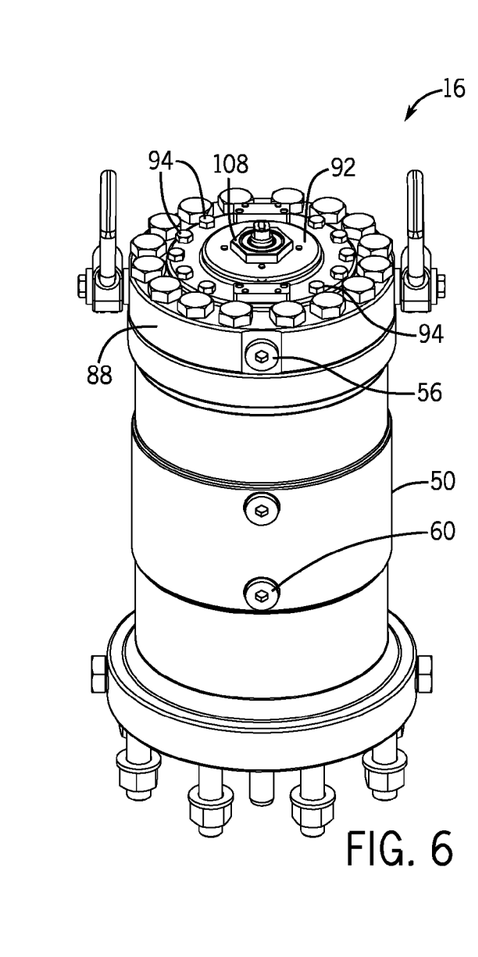
FIG. 6 is a perspective view of an actuator having an integrated bidirectional adjustable travel stop assembly, in accordance with an embodiment of the present disclosure.

FIGS. 6-12 are perspective views of an embodiment of the actuator 16, illustrating a method of independently and separately adjusting the upper travel stop 74 and the lower travel stop 76. First, FIG. 6 illustrates the actuator 16 with the top cover 92 secured to the top flange 88 with the bolts 94. In the illustrated embodiment, the travel stop bushing 78 may be in the first orientation. That is, the first axial end 114 of the travel stop bushing 78 is disposed axially downward within the actuator 16, and the second axial end 116 of the travel stop bushing is disposed axially upward within the actuator 16. As a result, the splines of the inner diameter 124 of the first axial end 114 of the travel stop bushing 78 and the splines of the outer diameter 126 of the axial end 128 of the central shaft 84 engage with one another, thereby blocking rotation of the travel stop bushing 78. In certain embodiments, before adjusting the upper travel stop 74 and/or the lower travel stop 76, it may be desirable to actuate and/or equalize the piston 52 within the piston chamber 54, such that the piston 52 is not contacting the upper travel stop 74 and the lower travel stop 76. For example, in the manner discussed in detail above, a hydraulic fluid may be pumped into the piston chamber 54 through the first port 56 and/or the second port 60. In this manner, the piston 52 may be actuated to position the piston 52 out of contact with the upper travel stop 74 and the lower travel stop 76.

Figure 7:
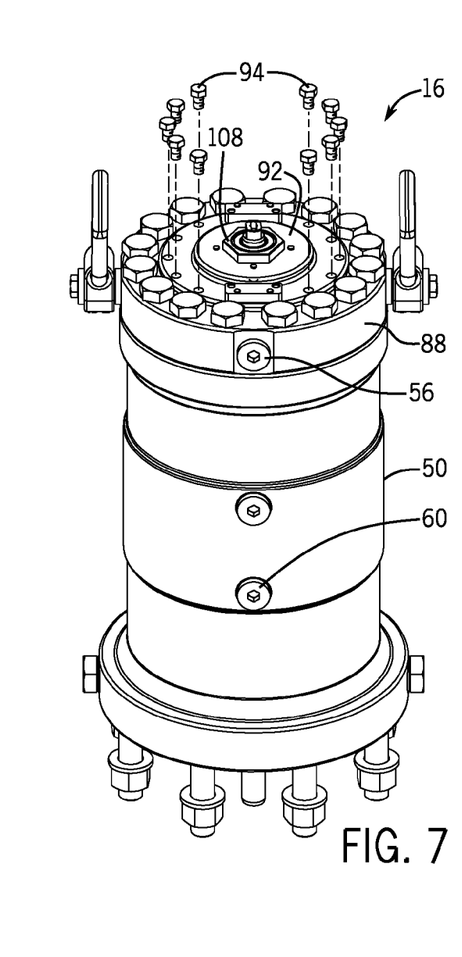
FIG. 7 is a perspective view of an actuator having an integrated bidirectional adjustable travel stop assembly, in accordance with an embodiment of the present disclosure.

Once the piston 52 is equalized within the piston chamber 54, the bolts 94 (e.g., hex bolts) may be unscrewed or threadingly removed from the upper flange 88 and the top cover 92, as shown in FIG. 7. With the bolts 94 removed, the top cover 92 may be rotated. More specifically, a wrench or other tool may be used to grip or engage with the extrusion 108 (e.g., hexagonal extrusion) of the top cover 92 and apply a torque to rotate the top cover 92. In the manner described in detail above, rotational movement of the top cover 92 is translated to the upper flange 88. As the upper flange 88 is rotated, the axial position of the upper travel stop 74 may be adjusted, as described above, thereby adjusting the range of movement (e.g., stroke) of the piston 52.

Figure 8:
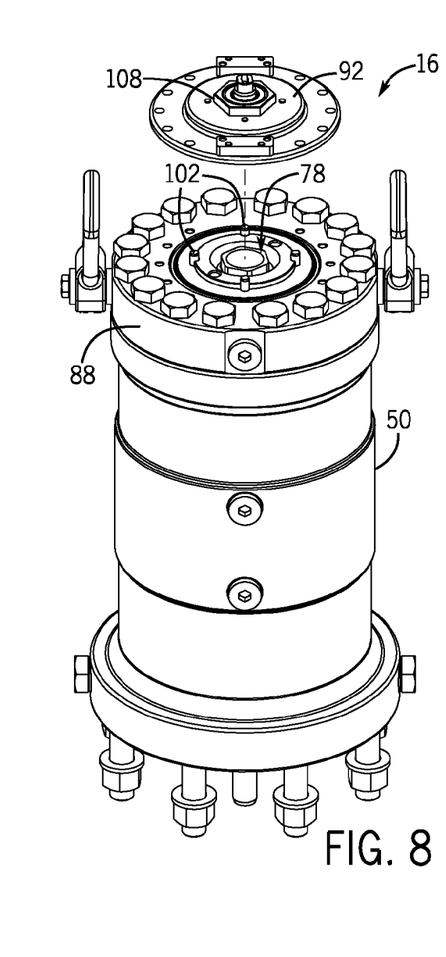
FIG. 8 is a perspective view of an actuator having an integrated bidirectional adjustable travel stop assembly, in accordance with an embodiment of the present disclosure.
Figure 9:
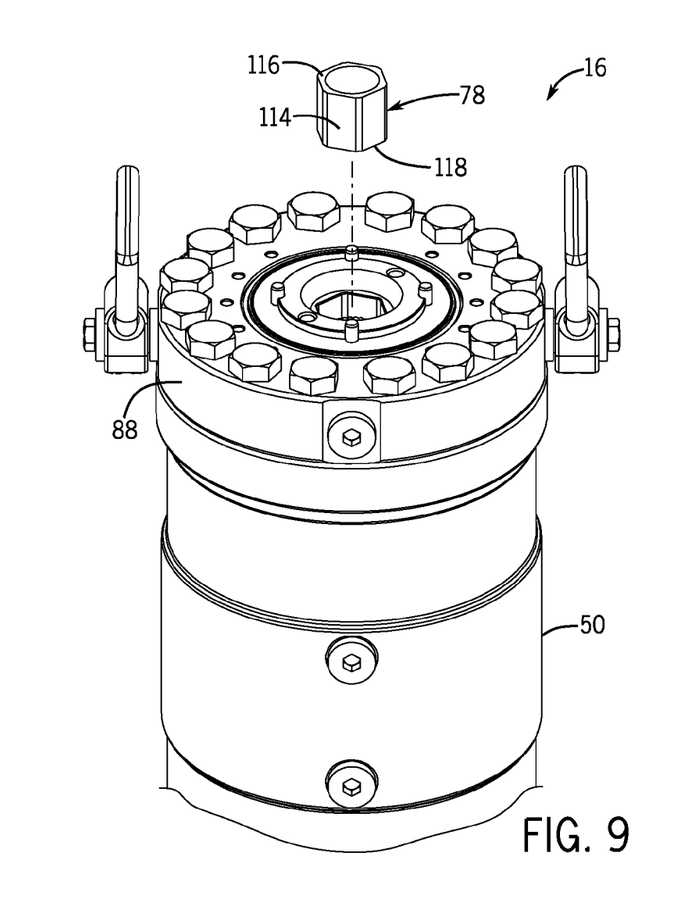
FIG. 9 is a perspective view of an actuator having an integrated bidirectional adjustable travel stop assembly, in accordance with an embodiment of the present disclosure.
Figure 10:
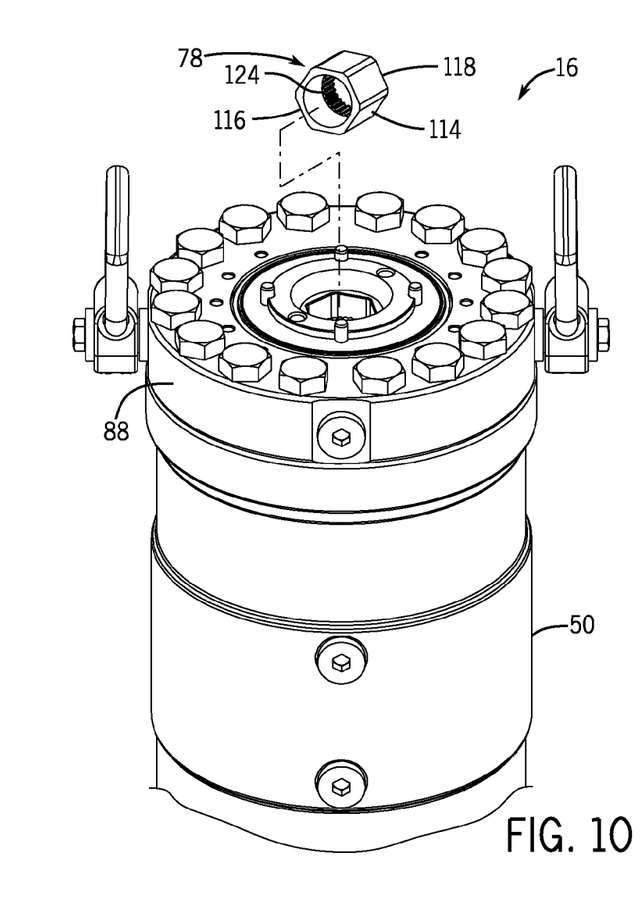
FIG. 10 is a perspective view of an actuator having an integrated bidirectional adjustable travel stop assembly, in accordance with an embodiment of the present disclosure.
Figure 11:
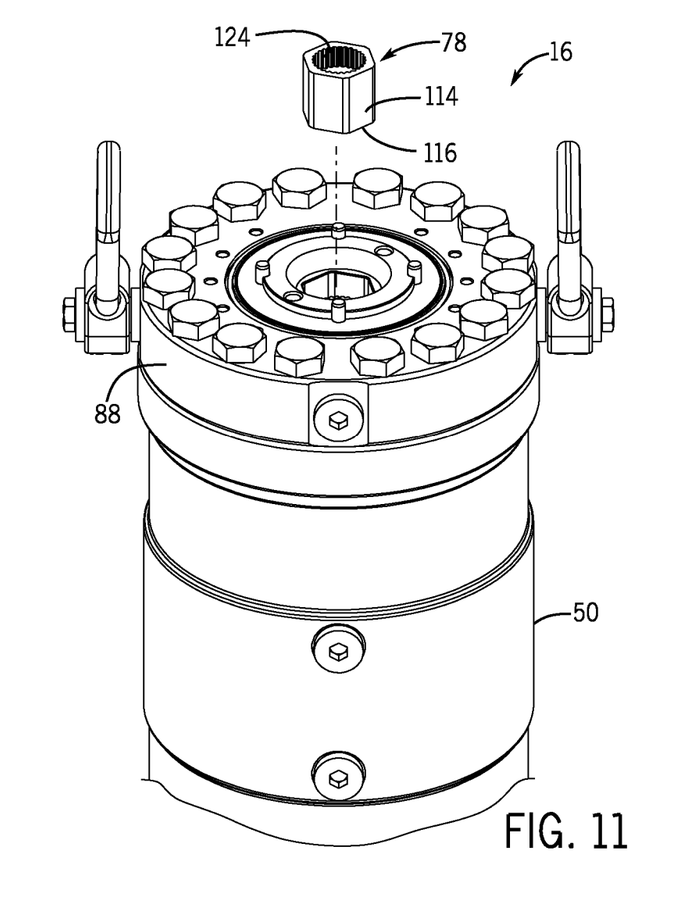
FIG. 11 is a perspective view of an actuator having an integrated bidirectional adjustable travel stop assembly, in accordance with an embodiment of the present disclosure.
Figure 12:
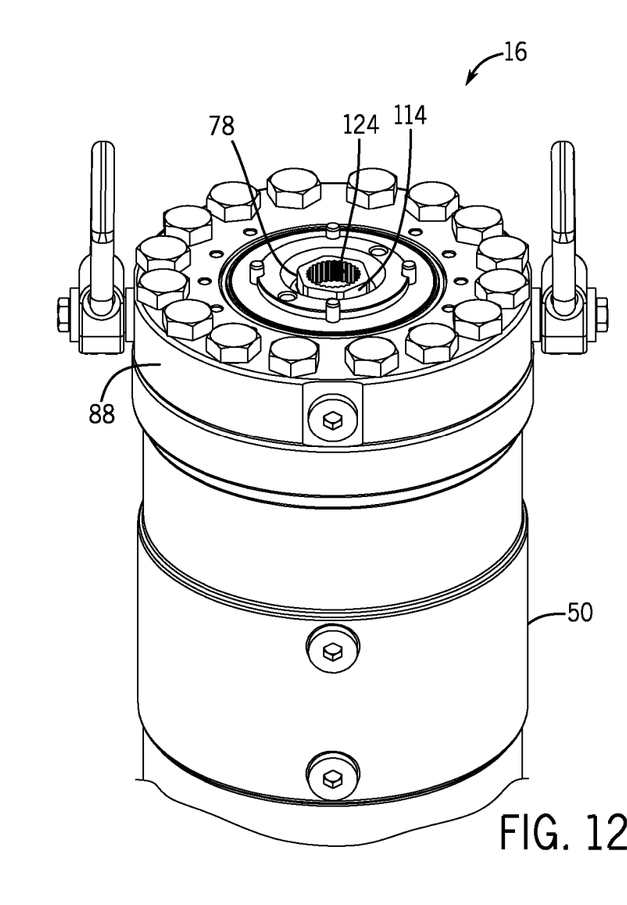
FIG. 12 is a perspective view of an actuator having an integrated bidirectional adjustable travel stop assembly, in accordance with an embodiment of the present disclosure.

After the axial position of the upper travel stop 74 is adjusted (e.g., via threads), the axial position of the lower travel stop 76 may be adjusted. Specifically, as shown in FIG. 8, the top cover 92 of the actuator 16 may be removed from the pins 102 and the actuator 16, thereby exposing the travel stop bushing 78. With the travel stop bushing 78 accessible, the travel stop bushing 78 may be removed from the actuator 16, as shown in FIG. 9. Thereafter, the travel stop bushing 78 may be adjusted (e.g., rotated axially and/or axially reversed) from the first orientation to the second orientation, as shown in FIGS. 10 and 11. More specifically, as shown in FIGS. 10 and 11, the travel stop bushing 78 is rotated such that the second axial end 116 of the travel stop bushing 78 is disposed axially downward and the first axial end 114 is disposed axially upward. With the travel stop bushing 78 in the second orientation, the travel stop bushing 78 may be disposed within the actuator 16, as shown in FIG. 12. As discussed in detail above, in the second orientation, the splines of the outer diameter 126 of the axial end 128 of the central shaft 84 may not engage with the travel stop bushing 78. As a result, rotation of the travel stop bushing 78 (e.g., imparted by a wrench or other tool) may not be blocked and may be transferred to the travel stop tube 86. In the manner described above, rotation of the travel stop bushing 78, and thus rotation of the travel stop tube 86, enables adjustment of the lower travel stop 76. That is, the travel stop bushing 78 may be rotated (e.g., via a wrench or other tool), thereby transferring rotational movement to the travel stop tube 86. As the travel stop tube 86 is rotated, the threads of the outer diameter 154 of the travel stop tube 86 and the threads of the inner diameter 156 of the lower travel stop 76 engage with one another and enable axial movement of the lower travel stop 76, as discussed above.

As discussed in detail above, embodiments of the present disclosure are directed towards the integrated bidirectional travel stop assembly 32 for the actuator 16 (e.g., a compact actuator). More specifically, the integrated bidirectional travel stop assembly 32 may be configured to enable independent setting and adjustment of the open and closed positions of a valve (e.g., ball valve 20) actuated by the actuator 16. For example, the integrated bidirectional travel stop assembly 32 includes the upper travel stop 74 that may be separately and/or independently adjusted to increase and/or decrease the stroke (e.g., range of movement) of the actuator 16. As such, through adjustment of the upper travel stop 74, the opened or closed position of a valve (e.g., ball valve 20) may be adjusted. Similarly, the integrated bidirectional travel stop assembly 32 includes the lower travel stop 76 that may be separately and/or independently adjusted to increase and/or decrease the stroke of the actuator 16. As such, through adjustment of the lower travel stop 74, the opened or closed position of a valve (e.g., ball valve 20) may be adjusted. Furthermore, the integrated bidirectional travel stop assembly 32 includes the travel stop bushing 78 configured to enable adjustment of the lower travel stop 76 when the travel stop bushing 78 is in a first axial orientation within the actuator 16. Additionally, while the upper travel stop 74 is adjusted, the travel stop bushing 78 may be positioned in a second axial orientation within the actuator 16 to block adjustment of the lower travel stop 76.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a valve actuator, comprising;
an actuation element;
a first travel stop, wherein a first axial position of the first travel stop is configured to limit movement of the actuation element;
a second travel stop, wherein a second axial position of the second travel stop is configured to limit movement of the actuation element; and
a travel stop bushing comprising a first axial end and a second axial end, wherein the travel stop bushing is configured to block adjustment of the first travel stop and allow adjustment of the second travel stop when the first axial end of the travel stop bushing is an axially innermost end of the travel stop bushing within the valve actuator, and wherein the travel stop bushing is configured to enable adjustment of the first travel stop when the second axial end of the travel stop bushing is the axially innermost end of the travel stop bushing within the valve actuator.

2. The system of claim 1, wherein the first axial end of the travel stop bushing comprises a first set of splines configured to engage with a second set of splines of a central shaft of the valve actuator when the first axial end of the travel stop bushing is the axially innermost end of the travel stop bushing within the valve actuator.

3. The system of claim 1, wherein the valve actuator comprises a hydraulic piston.

4. The system of claim 1, wherein the first travel stop is disposed about a travel stop tube of the valve actuator, and the first travel stop comprises a threaded inner diameter configured to engage with a threaded outer diameter of the travel stop tube.

5. The system of claim 1, wherein the valve actuator comprises:
a flange;
a cover disposed on top of the flange; and
a plurality of pins extending from the second travel stop into the cover, wherein rotational movement of the cover is transferred to the second travel stop.

6. The system of claim 5, wherein the flange is disposed about the second travel stop, and the second travel stop comprises a threaded outer diameter configured to engage with a threaded inner diameter of the flange.

7. A system, comprising:
a bidirectional travel stop assembly, comprising:

a first travel stop configured to block a first axial movement of an actuation element of a valve actuator;

a second travel stop configured to block a second axial movement of the actuation element; and a travel stop bushing configured to block adjustment of the second travel stop and allow adjustment of the first travel stop when the travel stop bushing is disposed within the valve actuator in a first axial orientation, wherein a first axial end of the travel stop bushing is an innermost end of the travel stop bushing within the valve actuator in the first axial orientation, wherein the travel stop bushing is configured to enable adjustment of the second travel stop when the travel stop bushing is disposed within the valve actuator in a second axial orientation, and wherein a second axial end of the travel stop bushing opposite the first axial end is the innermost end of the travel stop bushing within the valve actuator in the second axial orientation.

8. The system of claim 7, comprising the valve actuator having the actuation element, wherein the actuation element comprises a piston.

9. The system of claim 7 wherein a first inner diameter of the first axial end comprises a splined surface, and a second inner diameter of the second axial end comprises a smooth surface.

10. The system of claim 7, wherein the travel stop bushing comprises a hexagonal outer perimeter.

11. The system of claim 7, wherein the first axial orientation is axially reversed relative to the second axial orientation.

12. A system, comprising:
a valve; and
a valve actuator coupled to the valve, wherein the valve actuator comprises:
an actuation element;
a first travel stop, wherein a first axial position of the first travel stop is configured to limit a first axial movement of the actuation element;
a second travel stop, wherein a second axial position of the second travel stop is configured to limit a second axial movement of the actuation element, wherein the first axial position of the first travel stop and the second axial position of the second travel stop are separately and independently adjustable; and a travel stop bushing configured to block adjustment of the second travel stop and allow adjustment of the first travel stop when the travel stop bushing is in a first axial orientation within the valve actuator, wherein the travel stop bushing is configured to enable adjustment of the second travel stop when the travel stop bushing is in a second axial orientation within the valve actuator, wherein a first axial end of travel stop bushing is disposed within the valve actuator first when the travel stop bushing is in the first axial orientation, and wherein a second axial end of the travel stop bushing opposite the first axial end is disposed within valve actuator first when the travel stop bushing is in the second axial orientation.

13. The system of claim 12, wherein the first axial orientation and the second axial orientation are axially reversed relative to one another.

14. The system of claim 12, wherein the travel stop bushing comprises a splined inner diameter at the first axial end of the travel stop bushing and a smooth inner diameter at the second axial end of the travel stop bushing.

15. The system of claim 12, wherein the valve actuator comprises:
a flange;
a cover disposed on top of the flange and the first travel stop; and
a plurality of pins extending from the first travel stop into the cover, wherein rotational movement of the cover is transferred to the first travel stop, wherein the first travel stop comprises a threaded outer diameter configured to engage with a threaded inner diameter of the flange.

16. The system of claim 12, wherein the valve actuator comprises a travel stop tube, wherein the rotation of the travel stop bushing is transferred to the travel stop tube when the travel stop bushing is in the second axial orientation, wherein the second travel stop is disposed about the travel stop tube, and wherein the second travel stop and the travel stop tube are in threaded engagement.

17. The system of claim 12, wherein the actuation element comprises a hydraulic piston.

* * * * *

UNITED STATES PATENT AND TRADEMARK OFFICE
CERTIFICATE OF CORRECTION

PATENT NO. : 9,518,666 B2
APPLICATION NO. : 14/471985
DATED : December 13, 2016
INVENTOR(S) : Alberto Dequarti and Davide Navone

Page 1 of 1

It is certified that error appears in the above-identified patent and that said Letters Patent is hereby corrected as shown below:

On the Title Page

In item (30), in Column 1, in "Foreign Application Priority Data", delete "(IT)" and insert --(EP)--, therefor.

Signed and Sealed this
Twenty-ninth Day of October, 2019

Andrei Iancu
*Director of the United States Patent and Trademark Office*